Dec. 4, 1956 W. J. DUNNET 2,773,133

MAGNETIC AMPLIFIERS

Filed May 25, 1954 2 Sheets-Sheet 1

WITNESSES:

E. A. McCloskey

K. W. Thomas

INVENTOR

Wallace J. Dunnet.

BY Ezra W. Savage

ATTORNEY

United States Patent Office 2,773,133

Patented Dec. 4, 1956

2,773,133

MAGNETIC AMPLIFIERS

Wallace J. Dunnet, Newtonville, Mass., assignor to Westinghouse Electric Corporation, East Pittsburgh, Pa., a corporation of Pennsylvania Application May 25, 1954, Serial No. 432,135

13 Claims. (Cl. 179—171)

This invention relates in general to magnetic amplifiers and more particularly to magnetic amplifiers which have a rapid time response with a substantially linear output characteristic.

In certain magnetic amplifier applications it is desirable to have as rapid a time response in the load circuit of the magnetic amplifier as possible. Further, this time response should not be dependent upon the gain of the magnetic amplifier. For instance, in the usual full-wave self-saturating type magnetic amplifier, the speed of response in the load circuit of the magnetic amplifier is dependent upon the gain of the self-saturating magnetic amplifier and may be many seconds if the gain of the self-saturating magnetic amplifier is sufficiently high.

In those magnetic amplifiers which operate on the principle of driving a magnetic core member to saturation during the gating portion of the cycle and then resetting the flux level in the magnetic core member to some lower value during the resetting portion of the cycle, it is important that the gating portion of the cycle be independent of the resetting portion of the cycle. For instance, if the control signal is of zero magnitude, the supply voltage should not be permitted to effect a resetting of the magnetic core member. If such a resetting is permitted to occur, a false indication of the magnitude of the control signal will be obtained at the load. Further, if the supply voltage is able to effect a resetting of the magnetic amplifier during the resetting portion of the cycle, the range of operation of the magnetic amplifier will be decreased since the control signal is then only able to effect a resetting of the magnetic core member over the remaining portion of the hysteresis loop of the magnetic core member.

The operation of most prior art magnetic amplifiers is affected by changes in the magnitude of the supply voltage applied to the magnetic amplifier. That is, a change in the magnitude of the supply voltage effects a change in the magnitude of the voltage appearing across the load which is connected to the output of the magnetic amplifier. Therefore, it is desirable that the operation of a magnetic amplifier be independent of the magnitude of its supply voltage.

An object of this invention is to provide a magnetic amplifier having a high speed of response and one whose operation is relatively independent of changes in the magnitude of its supply voltage.

Another object of this invention is to provide a magnetic amplifier having a high speed of response and one which will produce an output voltage of greater magnitude than its supply voltage.

A further object of this invention is to provide a magnetic amplifier having a high speed of response and one whose load is electrically isolated from its control circuit.

Other objects of this invention will become apparent from the following description when taken in conjunction with the accompanying drawings, in which.

Figure 1:
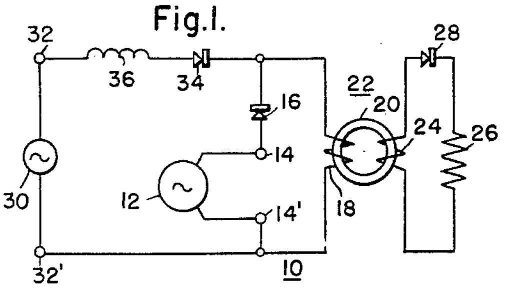
Figure 1 is a schematic diagram of a half-wave magnetic amplifier illustrating this invention and in which a source of alternating-current voltage is applied to the control terminals.

Referring to Fig. 1 there is illustrated a half-wave magnetic amplifier 10 embodying a teaching of this invention. In general, the magnetic amplifier 10 comprises a parallel circuit, one branch of which includes a source 12 of alternating-current control voltage connected to control terminals 14 and 14', and a control rectifier 16, and the other branch of which includes a primary or reactor winding 18 disposed in inductive relationship with the magnetic core member 20 of a saturable reactor 22, or more specifically a saturating transformer. As illustrated, a secondary winding 24 is also disposed in inductive relationship with the magnetic core member 20. In practice, the turns ratio between the primary winding 18 and the secondary winding 24 determines the voltage amplification of the magnetic amplifier 10. Therefore, the magnetic amplifier 10 is capable of producing an output voltage of greater magnitude than its supply voltage.

In order to prevent the flow of current through a load 26 during the reset portion of the operation, a load rectifier 28 is connected in series circuit relationship with the load 26, the series circuit being connected across the secondary winding 24 of the saturating transformer 22. As will be explained hereinafter, the magnitude of the average voltage across the load 26 is dependent upon the magnitude of the control voltage applied to the terminals 14 and 14'.

As illustrated, the parallel circuit, one branch of which includes the control rectifier 16 and the source 12, and the other branch of which includes the primary winding 18 of the saturating transformer 22, is connected to a source 30 of alternating-current supply voltage, the source 30 being directly connected to supply terminals 32 and 32'. In operation the voltage of the source 30 of alternating-current voltage is always of greater magnitude than the voltage of the source 12 of alternating-current control voltage. The necessity for maintaining such a relationship will be explained hereinafter.

The circuit means for interconnecting the source 30 of alternating-current voltage to the parallel circuit, one branch of which includes the source 12 and the control rectifier 16, and the other branch of which includes the primary winding 18 of the saturating transformer 22, includes the load rectifier 34 which is so interconnected as to obtain a maximum of efficiency for the magnetic amplifier 10, and the current-limiting impedance or inductance member 36 which limits the magnitude of the current through the primary winding 18 once the magnetic core member 20 has substantially completely saturated. The other functions of the load rectifier 34 will be brought out hereinafter in the description of the operation of the magnetic amplifier 10.

The operation of the magnetic amplifier 10 is divided into two portions, the gating portion of the supply voltage as applied to the supply terminals 32 and 32', and the reset portion of the supply voltage as applied to the terminals 32 and 32'. That is, during one half-cycle of the supply voltage, when the terminal 32 is at a positive polarity with respect to the terminal 32', the gating portion of the operation takes place, and then during the next half-cycle, when the terminal 32' is at a positive polarity with respect to the terminal 32, the reset portion of the operation takes place.

During the gating portion of the supply voltage, when the terminal 32 is at a positive polarity with respect to the terminal 32', current flows from the terminal 32 through the inductance member 36, the load rectifier 34, and the primary winding 18 of the saturating transformer 22, to the terminal 32'. The flow of the current through the primary winding 18, in the forward direction, effects an induced voltage across the secondary winding 24 of the saturating transformer 22, which in turn effects a current flow through the load rectifier 28, in the forward direction, and through the load 26. At some period of this half-cycle of the alternating-current supply voltage, when the magnetic core member 20 has received a sufficient number of volt-seconds, the magnetic core member 20 substantially completely saturates, thereby reducing the voltage across the primary winding 18 to substantially zero magnitudes. Thus, when the magnetic core member 20 substantially completely saturates, the current flow through the load 26 decreases to zero magnitude.

The function of the control rectifier 16, during the gating portion of the supply voltage, is twofold, namely, to prevent the control source 12 from shunting the supply voltage, as applied to the terminals 32 and 32', and to prevent the primary winding 18 from shunting the control source 12. In order for the control rectifier 16 to perform this function, the magnitude of the supply voltage, as applied to the terminals 32 and 32', must be of greater magnitude than the control voltage, as applied to the terminals 14 and 14'. When these conditions exist, a back-voltage appears across the control rectifier 16.

It is to be noted that the quality of the control rectifier 16 need not be high in order to obtain a proper operation, the only requirement being that the back-impedance of the control rectifier 16 be large enough so as to introduce adequate isolating impedance between the supply voltage as applied to the terminals 32 and 32' and the control course 12, and between the control source 12 and the primary winding 18.

During the next half-cycle of the supply voltage, when the supply terminal 32' is at a positive polarity with respect to the supply terminal 32, and when the control terminal 14' is at a positive polarity with respect to the control terminal 14, the reset portion of the operation takes place. In order to obtain a proper operation during the reset portion of the cycle, the reverse or back-impedance of the load rectifier 34 combined with the impedance of the inductance member 36 should be relatively high as compared to the forward-impedance of the circuit including the forward-impedance of the control rectifier 16 and the impedance of the source 12 of control voltage. Theoretically, the forward-impedance of the parallel circuit, one branch of which includes the source 12 and the control rectifier 16, and the other branch of which includes the primary winding 18 of the saturating transformer 22, should be low as compared to the combined impedance of the inductance member 36 and the load rectifier 34, in the reverse direction. However, it is sufficient to consider only the forward-impedance of the branch including the forward-impedance of the control rectifier 16 and the impedance of the source 12, since the impedance of the primary winding 18 of the saturating transformer 22 is extremely high during the reset portion of the operation, when the supply terminal 32' is at a positive polarity with respect to the supply terminal 32.

When the control voltage, as effected by the source 12, is of zero magnitude, and when the supply terminal 32' is at a positive polarity with respect to the supply terminal 32, current flows through the source 12, the control rectifier 16, in the forward direction, the load rectifier 34, in the reverse direction, and the inductance member 36, to the supply terminal 32. The magnitude of this current flow is determined by the leakage of the load rectifier 34. However, during this reset portion of the supply voltage, it is to be noted that if the combined impedance of the source 12 and the control rectifier 16, in the forward direction, is small as compared to the combined impedance of the inductance 36 and the load rectifier 34, in the reverse direction, substantially no voltage is developed across the circuit including the source 12 and the load rectifier 16, to thereby effect a resetting of the flux level in the magnetic core member 20 when the control voltage is of zero magnitude. Therefore, there is no false indication of the magnitude of the control voltage as effected by the source 12.

It is to be noted that the load rectifier 34 need not be of high quality since its back-impedance plus the impedance of the inductance member 36 need only be high as compared to the forward-impedance of the circuit including the forward-impedance of the control rectifier 16 and the impedance of the control source 12.

During the reset portion of the supply voltage, as applied to the terminals 32 and 32', the supply voltage and the control voltage, as applied to the terminals 14 and 14', are in electrical opposition to one another and cooperate to determine the magnitude of the current flow through the primary winding 18 in the reverse direction. In other words, during the reset portion of the supply voltage, current flows from the terminal 32' through the control source 12, the control rectifier 16, in the forward direction, the load rectifier 34, in the reverse direction, and the inductance member 36, to the terminal 32. This current effectively keeps the control rectifier 16 unblocked so that the control source 12 can supply exciting current from the terminal 14', through the primary winding 18, in the reverse direction, and the control rectifier 16, in the reverse direction, to the control terminal 14, to thereby reset the core member 20. An increase in the magnitude of the control source, as applied to the terminals 14 and 14', increases the magnitude of the current flow through the primary winding 18 in the opposite direction. This, in turn, increases the magnitude of the reset-voltage developed across the primary winding 18, as effected by the control voltage, and, therefore, effects a change in the flux level in the magnetic core member 20 to a predetermined lower level. Then during the next half-cycle of the supply voltage, namely during the gating portion of the supply voltage, when the terminal 32 is at a positive polarity with respect to the terminal 32', more energy in the form of volt-seconds must be supplied to the magnetic core member 20 before it substantially completely saturates. Therefore, an average voltage of greater magnitude appears across the load 26 with an increase in the magnitude of the control voltage, as applied to the terminals 14 and 14'. During the reset portion of the supply voltage there is a voltage induced in the secondary winding 24 such as to produce a back-voltage across the load rectifier 28. Any leakage current that flows through the load rectifier 28 as a result of this back-voltage will be reflected into the primary winding 18 and will appear as an increase in the excitation current.

On the other hand, during the reset portion of the supply voltage, a decrease in the magnitude of the control voltage, as applied to the terminals 14 and 14′, increases the magnitude of the net current flow through the circuit including the source 12 and the control rectifier 16, and decreases the current flow through the circuit including the primary winding 18 of the saturating transformer 22. A decrease in the current flow in the reverse direction through the primary winding 18 decreases the reset-voltage developed thereacross, and therefore, the flux level in the magnetic core member 20 is not reset to as low a level as when the control voltage was of greater magnitude. During the next half-cycle of the supply voltage, when the supply terminal 32 is at a positive polarity with respect to the supply terminal 32′, a lesser amount of energy has to be applied to the magnetic core member 20 to substantially completely saturate the core member. Therefore, the average voltage appearing across the load 26 decreases with a decrease in the magnitude of the control voltage.

In practice, the combined impedance of the inductance member 36 and the load rectifier 34, in the reverse direction, should be sufficiently low such that the current flow during the reset portion of the supply voltage from the terminal 32′ through the control source 12, the control rectifier 16, in the forward direction, the load rectifier 34, in the reverse direction, and the inductance member 36 to the supply terminal 32 is sufficiently large so as to keep the control rectifier 16 unblocked during the entire resetting half-cycle. Thus, there is a minimum and maximum back-impedance allowable for the load rectifier 34 in order to obtain proper operation of the magnetic amplifier 10.

Figure 2:
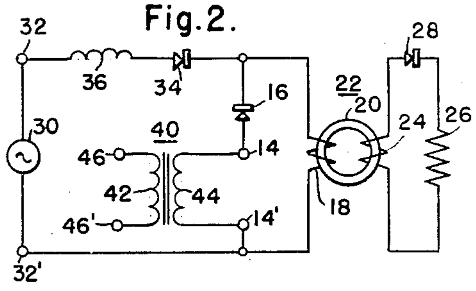
Fig. 2 is a schematic diagram of a half-wave magnetic amplifier similar to the magnetic amplifier illustrated in Fig. 1 except that the control voltage is first applied to a potential transformer.

Referring to Fig. 2, there is illustrated another embodiment of the teachings of this invention, in which like components of Figs. 1 and 2 have been given the same reference characters. The main distinction between the apparatus illustrated in Figs. 1 and 2 is that in the apparatus of Fig. 2, the alternating-current control voltage is first applied to a potential transformer 40 having a primary winding 42 and a secondary winding 44. In particular, the alternating-current control voltage is applied to input terminals 46 and 46′ which are connected in circuit relationship with the primary winding 42 of the transformer 40. On the other hand, the secondary winding 44 is connected in circuit relationship with the control terminals 14 and 14′.

In order to secure proper operation of the magnetic amplifier illustrated in Fig. 2, the combined impedance of the inductance member 36 and the load rectifier 34, in the reverse direction, should be high as compared to the forward-impedance of the circuit including the impedance of the secondary winding 44 and the forward-impedance of the control rectifier 16. In addition, the combined impedance of the inductance member 36 and the load rectifier 34, in the reverse direction, should be sufficiently low such that the current flow during the reset portion of the supply voltage, from the terminal 32′ through the secondary winding 44 of the transformer 40, the control rectifier 16, in the forward direction, the load rectifier 34, in the reverse direction, and the inductance member 36 to the supply terminal 32, is sufficiently large so as to keep the control rectifier 16 unblocked during the entire resetting half-cycle.

In Fig. 2, the function of the control rectifier 16, during the gating portion of the supply voltage, is twofold, namely, to prevent the control source, including the transformer 40, from shunting the supply voltage as applied to the terminals 32 and 32′, and to prevent the primary winding 18 from shunting the control source, including the transformer 40. In order for the control rectifier 16, of Fig. 2, to accomplish this function, the magnitude of the supply voltage, as applied to the terminals 32 and 32′, must be greater than the magnitude of the control voltage, as applied to the terminals 14 and 14′. When these conditions exist, a back-voltage appears across the control rectifier 16.

By providing the transformer 40 and applying the control voltage to the input terminals 46 and 46′, a higher voltage amplification can be obtained for the magnetic amplifier illustrated in Fig. 2 than can be obtained for the magnetic amplifier 10 illustrated in Fig. 1. The amount of this amplification is determined in part by the turns ratio of the transformer 40. Of course, the turns ratio of the saturating transformer 22 also determines the voltage amplification of the magnetic amplifier illustrated in Fig. 2. However, by providing the transformer 40, the magnetic amplifier illustrated in Fig. 2 is capable of amplifying control signals of extremely small magnitude.

As was the case with the apparatus illustrated in Fig. 1, when the supply terminal 32, illustrated in Fig. 2, is at a positive polarity with respect to the supply terminal 32′, the control terminal 14, illustrated in Fig. 2, is at a positive polarity with respect to the control terminal 14′. Since the remaining operation of the magnetic amplifier illustrated in Fig. 2 is substantially identical to the operation of the magnetic amplifier 10, illustrated in Fig. 1, a further description of such operation is deemed unnecessary.

Figure 3:
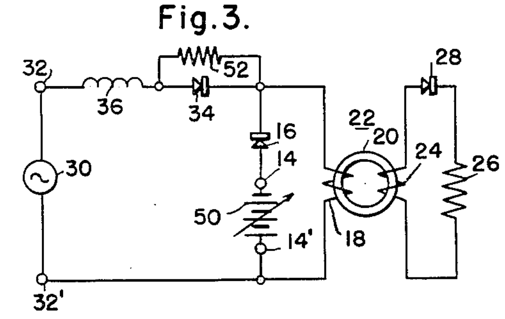
Fig. 3 is a schematic diagram of a half-wave magnetic amplifier similar to the magnetic amplifier illustrated in Fig. 1 except that the control voltage applied to the control terminals is received from a source of direct-current control voltage, and means is provided for extending the range of resetting of the saturable reactor incorporated in the magnetic amplifier.

Referring to Fig. 3, there is illustrated still another embodiment of this invention in which like components of Figs. 1 and 3 have been given the same reference characters. One distinction between the apparatus of Figs. 1 and 3 is that in the apparatus of Fig. 3 a source 50 of direct-current control voltage has been substituted for the source 12 of alternating-current voltage, as illustrated in Fig. 1. The source 50 of direct-current control voltage is so connected to the control terminals 14 and 14′, that the positive side of the source 50 is connected to the terminal 14′ and the negative side of the source 50 is connected to the terminal 14. Thus, the source 50 of direct-current control voltage is in electrical opposition to the control rectifier 16.

Another distinction between the magnetic amplifiers illustrated in Figs. 1 and 3 is that in the magnetic amplifier of Fig. 3 a resistor 52 is connected in parallel circuit relationship with the load rectifier 34, in order to extend the range of resetting of the magnetic core member 20 of the saturating transformer 22 if the impedance of the inductance member 36 combined with the back-impedance of the load rectifier 34 is too high to obtain proper operation. With the resistor 52 connected in parallel circuit relationship with the load rectifier 34, the magnetic amplifier is rendered less sensitive to changes in the temperature of the air surrounding the amplifier. For instance, in practice, the reverse-impedance of the load rectifier 34 may be fifty times the impedance of the resistor 52. Therefore, during the reset portion of the operation, when the supply terminal 32′ is at a positive polarity with respect to the supply terminal 32, substantially all of the current flowing to the supply terminal 32 flows though the resistor 52. Such being the case, changes in the magnitude of the reverse-impedance of the load rectifier 34, due to changes in the temperature of the air surrounding the load rectifier 34, have substantially no effect on the operation of the magnetic amplifier illustrated in Fig. 3. Therefore, the load rectifier 34 of Fig. 3 need not be of high quality.

In order to secure proper operation of the magnetic amplifier of Fig. 3, the impedance of the inductance member 36 combined with the back-impedance of the parallel circuit, including the resistor 52 and the load rectifier 34, should be high as compared to the combined impedance of the source 50 and the control rectifier 16, in the forward direction. On the other hand, the impedance of the inductance member 36 combined with the back-impedance of the parallel circuit, including the resistor 52 and the load rectifier 34, should be sufficiently low such that the current flow, during the reset portion of the supply voltage, from the terminal 32′, through the source 50, the control rectifier 16, in the forward direction, the parallel circuit including the resistor 52 and the load rectifier 34 and the inductance member 36 to the supply terminal 32, is sufficiently large so as to keep the control rectifier 16 unblocked during the entire resetting half-cycle. Thus, again, there is a minimum and maximum back-impedance allowable for the load rectifier 34 in order to obtain proper operation of the magnetic amplifier illustrated in Fig. 3.

In operation, the control rectifier 16 of Fig. 3 prevents the source 50 of direct-current control voltage from effecting a current flow in the reverse direction through the primary winding 18, during the gating portion of the supply voltage, when the supply terminal 32 is at a positive polarity wtih respect to the supply terminal 32′. As was the case with the apparatus of Fig. 1, the control rectifier 16 of Fig. 3 also has a twofold function, namely, to prevent the control source, namely the source 50, from shunting the supply voltage as applied to the terminals 32 and 32′, and to prevent the primary winding 18 from shunting the control source, namely the source 50. During the reset portion of the supply voltage, when the supply terminal 32′ is at a positive polarity with respect to the supply terminal 32, the operation of the magnetic amplifier illustrated in Fig. 3 is substantially identical to the operation of the magnetic amplifier 10, illustrated in Fig. 1.

It is to be understood that a resistor (not shown) of proper value can be substituted for the inductance member 36, illustrated in Figs. 1 through 3.

Figure 4:
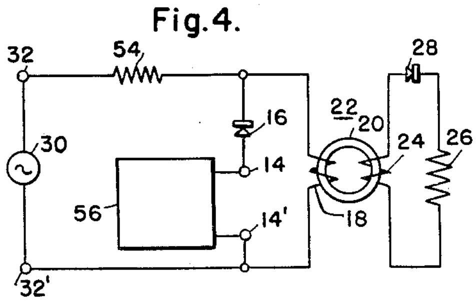
Fig. 4 is a schematic diagram of a simplified form of the magnetic amplifiers illustrated in Figs. 1 through 3.

Referring to Fig. 4, there is illustrated still another embodiment of this invention in which like components of Figs. 3 and 4 have been given the same reference characters. The main distinction between the apparatus illustrated in Figs. 3 and 4 is that in the apparatus of Fig. 4, a resistor 54 has been substituted for the inductance member 36, the load rectifier 34, and the resistor 52, illustrated in Fig. 3. Also in Fig. 4, a source 56 of control voltage is connected to the control terminals 14 and 14′. In practice, the source 56 can be either the source 12 of alternating-current control voltage, as illustrated in Fig. 1, the transformer 40 having an alternating-current control voltage applied thereto, or the source 50 of direct-current control voltage, as illustrated in Fig. 3. In order to secure proper operation, the impedance of the resistor 54 should be high as compared to the forward-impedance of the circuit including the impedance of the source 56 and the forward-impedance of the control rectifier 16. In addition, the impedance of the resistor 54 should be sufficiently low such that the current flow, during the reset portion of the supply voltage, from terminal 32′, through the source 56, the control rectifier 16, in the forward direction, and the resistor 54, to the supply terminal 32, is sufficiently large so as to keep the control rectifier 16 unblocked during the entire resetting half-cycle. Thus, there is a minimum and maximum impedance allowable for the resistor 54 in order to obtain proper operation of the magnetic amplifier illustrated in Fig. 4.

The function of the control rectifier 16 of Fig. 4, during the gating portion of the supply voltage, is twofold, namely, to prevent the control source 56 from shunting the supply voltage as applied to the terminals 32 and 32′, and to prevent the primary winding 18 from shunting the control source 56. In order for the control rectifier 16 to perform this function, the magnitude of the supply voltage, as applied to the terminals 32 and 32′, must be greater than the magnitude of the control voltage, as applied to the terminals 14 and 14′. When these conditions exist, a back-voltage appears across the control rectifier 16 of Fig. 4.

In general, the operation of the magnetic amplifier illustrated in Fig. 4 is similar to the operation of the magnetic amplifier illustrated in Fig. 3. However, the efficiency of the magnetic amplifier of Fig. 4 is not nearly as high as the efficiency of the magnetic amplifiers illustrated in Figs. 1 through 3. In particular, during the gating portion of the supply voltage, when the supply terminal 32 is at a positive polarity with respect to the supply terminal 32′, load current flows from the supply terminal 32 through the resistor 54 once the core member 20 saturates. This load current flowing through the resistor 54 causes a considerable loss of power if the resistor 54 is such as to provide sufficient impedance during the reset portion of the supply voltage, to thus obtain the proper high impedance ratio between the impedance of the resistor 54 and the forward-impedance of the circuit including the impedance of the source 56 and the forward-impedance of the control rectifier 16. Since the remaining operation of the apparatus illustrated in Fig. 4 is similar to the operation of the apparatus described hereinbefore, a further description of such operation is deemed unnecessary.

It is to be noted that in the magnetic amplifiers illustrated in Figs. 1 through 4, the magnitude of the voltage appearing across the load 26 is substantially independent of the magnitude of the supply voltage as applied to the terminals 32 and 32′. The reason the output voltage across the load 26 is substantially independent of the magnitude of the voltage across the supply terminals 32 and 32′, is that the supply voltage is always of such magnitude as to effect a substantially complete magnetic saturation of the magnetic core member 20. This can be better understood by considering that it takes a predetermined number of volt-seconds to saturate the magnetic core member 20, and if the magnitude of the supply voltage increases, the magnetic core member 20 will saturate within a predetermined time interval which will be of shorter duration than in the case when the supply voltage is of lesser magnitude. Further, the areas under the voltage-time curves for the primary winding 18 of the saturating transformer 22 are of substantially equal magnitude irrespective of the magnitude of the supply voltage across the terminals 32 and 32′, since the same predetermined volt-seconds are required to saturate the magnetic core member 20 each time.

Figure 5:
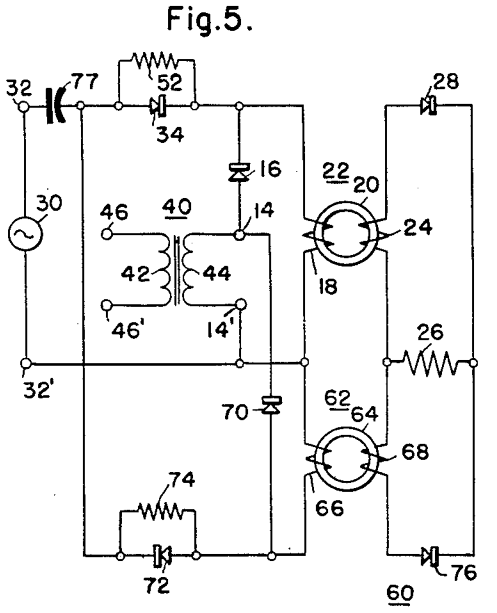
Fig. 5 is a schematic diagram of a full-wave magnetic amplifier illustrating this invention and in which an alternating-current control signal produces a direct-current voltage across the load.

Referring to Fig. 5 there is illustrated a full-wave magnetic amplifier 60 illustrating this invention and in which like components of Figs. 2, 3 and 5 have been given the same reference characters. As illustrated, the full-wave magnetic amplifier 60 comprises two half-wave magnetic amplifiers, one of which comprises the saturating transformer 22, the control rectifier 16, the resistor 52, the load rectifier 34, and the interconnections of these components. On the other hand, the other half-wave magnetic amplifier comprises a saturating transformer 62 having a magnetic core member 64, and primary and secondary windings 66 and 68, respectively, disposed in inductive relationship therewith, a control rectifier 70 corresponding to the control rectifier 16, a load rectifier 72 corresponding to the load rectifier 34, a resistor 74 connected in parallel circuit relationship with the load rectifier 72 and corresponding to the resistor 52, and a load rectifier 76 corresponding to the load rectifier 28. In practice, the impedance of a current-limiting capacitor 77 combined with the back-impedance of the parallel circuit, including the resistor 52 and the load rectifier 34, should be high as compared to the forward-impedance of the circuit including the forward-impedance of the control rectifier 16 and the impedance of the secondary winding 44 of the transformer 40. Further, the impedance of the current-limiting capacitor 77 combined with the back-impedance of the parallel circuit, including the resistor 74 and the load rectifier 72, should be high as compared to the forward-impedance of the circuit including the forward-impedance of the control rectifier 70 and the impedance of the secondary winding 44 of the transformer 40. On the other hand, the impedance of the capacitor 77 combined with the back-impedance of the parallel circuit, including the resistor 52 and the load rectifier 34, should be sufficiently low such that the current flow, during the reset portion of the supply voltage with respect to the core member 20, from the terminal 32′, through the secondary winding 44 of the transformer 40, the control rectifier 16, in the forward direction, the parallel circuit, including the resistor 52 and the load rectifier 34, and the capacitor 77, to the terminal 32, is sufficiently large so as to keep the control rectifier 16 unblocked during the entire resetting half-cycle. In addition, the impedance of the capacitor 77, combined with the back-impedance of the parallel circuit, including the resistor 74 and the load rectifier 72, should be sufficiently low such that the current flow, during the reset portion of the supply voltage with respect to the core member 64, from the supply terminal 32, through the capacitor 77, the parallel circuit, including the resistor 74 and the load rectifier 72, the control rectifier 70, in the forward direction, and the secondary winding 44 of the transformer 40, to the supply terminal 32′, is sufficiently large so as to keep the control rectifier 70 unblocked during the entire resetting half-cycle.

In the apparatus of Fig. 5, the source 40 of alternating-current control voltage functions as a common source of control voltage for the two half-wave magnetic amplifiers of the full-wave magnetic amplifier 60. Further in the apparatus of Fig. 5, the voltage of the source 30 of alternating-current voltage must in operation be of greater magnitude than the voltage of the common source 40 of alternating-current control voltage, as applied to the control terminals 14 and 14′.

In order to obtain direct current in the load 26, the load rectifiers 28 and 76 are interconnected with their associated components as illustrated. It is to be noted that the secondary winding 68 of the saturating transformer 62 is wound opposite from the secondary winding 24 of the saturating transformer 22.

As hereinbefore mentioned with reference to Fig. 1, the source 12 of control voltage and the control rectifier 16 comprise one branch of a parallel circuit and the primary winding 18 of the saturating transformer 22 comprises the other branch of the parallel circuit. In like manner, with reference to one of the two half-wave magnetic amplifiers illustrated in Fig. 5, one branch of the parallel circuit comprises the common source 40 of control voltage and the control rectifier 16, and the other branch of the parallel circuit comprises the primary winding 18 of the saturating transformer 22. On the other hand, with reference to the other of the two half-wave magnetic amplifiers illustrated in Fig. 5, one branch of its parallel circuit comprises the common source 40 of control voltage and the control rectifier 70, the other branch comprising the primary winding 66 of the saturating transformer 62. These two parallel circuits of the full-wave magnetic amplifier 60 are interconnected with the supply terminals 32 and 32′ in order to obtain a proper operation of the magnetic amplifier 60.

As illustrated, the current-limiting capacitor 77 has been substituted for the current-limiting inductance member 36 illustrated in Figs. 1 through 3. In operation the efficiency of the capacitor 77 is somewhat higher than the efficiency of the inductance member 36. However, in the embodiments illustrated in Figs. 1 through 4, the capacitor 77 cannot be utilized as the current limiting member since the capacitor 77 would charge up during the gating portion of the supply voltage, as applied to the terminals 32 and 32′, and therefore would block the flow of current to the supply terminal 32 during the reset portion of the supply voltage. The reason that the capacitor 77 can be utilized in the full-wave magnetic amplifier 60 is that alternating-current from the supply terminals 32 and 32′ is able to freely flow through the capacitor 77 during the operation of the apparatus. For instance, during the gating portion of the supply voltage, current flows from the supply terminal 32 through the capacitor 77, the load rectifier 34, and the primary winding 18 of the saturating transformer 22, to the supply terminal 32′. On the other hand, during the reset portion of the supply voltage current flows from the supply terminal 32′ through the primary winding 66 of the saturating transformer 62, the load rectifier 72, and the capacitor 77, to the supply terminal 32.

The operation of the magnetic amplifier 60 will now be described. Assuming the supply terminal 32 is at a positive polarity with respect to the supply terminal 32′, and assuming further that the control terminal 14 is at a positive polarity with respect to the control terminal 14′, then during this half-cycle of the operation, current flows from the supply terminal 32 through the capacitor 77, the load rectifier 34, and the primary winding 18 of the saturating transformer 22, in the forward direction, to the supply terminal 32′. When sufficient volt-seconds have been applied to the magnetic core member 20 of the saturating transformer 22, the magnetic core member 20 substantially completely saturates. However, up until the point of saturation, the exciting current flowing through the primary winding 18 effects an induced current in the secondary winding 24 of the saturating transformer 22, which flows through the load rectifier 28 in the forward direction and through the load 26. Of course, once the magnetic core member 20 saturates, the voltage across the primary winding 18 is reduced to substantially zero and the induced current in the secondary winding 24 is likewise reduced to zero magnitude. During this half-cycle of the supply voltage, when the supply terminal 32 is at a positive polarity with respect to the supply terminal 32′, the control rectifier 16 functions as hereinbefore described.

During this same half-cycle of the supply voltage, when the supply terminal 32 is at a positive polarity with respect to the supply terminal 32′, the supply voltage and the control voltage, as applied to the terminals 14 and 14′, are in electrical opposition to one another and cooperate to determine the magnitude of the current flow through the primary winding 66, of the saturating transformer 62, in the reverse direction. In other words, during the reset portion of the supply voltage with respect to the core member 64, current flows from the supply terminal 32, through the capacitor 77, the parallel circuit including the resistor 74 and the load rectifier 72, the control rectifier 70, in the forward direction, and the secondary winding 44 of the transformer 40, to the supply terminal 32′. This current effectively keeps the control rectifier 70 unblocked so that the control source, the transformer 40, can supply exciting current from the control terminal 14, through the control rectifier 70, in the reverse direction, and the primary winding 66, in the reverse direction, to the control terminal 14′, to thereby reset the core member 64. An increase in the magnitude of the control voltage as applied to the terminals 14 and 14′ increases the magnitude of the current flow through the primary winding 66 in the opposite direction. In operation, the current induced in the secondary winding 68, by the reset-voltage across the primary winding 66, is blocked by the load rectifier 76 and does not flow through the load 26.

During the next half-cycle of the supply voltage, when the supply terminal 32′ is at a positive polarity with respect to the supply terminal 32, and when the control terminal 14′ is at a positive polarity with respect to the terminal 14, current flows from the supply terminal 32′ through the primary winding 66 of the saturating transformer 62, in the forward direction, the load rectifier 72, and the capacitor 77, to the supply terminal 32. When a sufficient number of volt-seconds have been applied to the magnetic core member 64 of the saturating transformer 62, the magnetic core member 64 substantially completely saturates. Up to the point when the magnetic core member 64 saturates, a current is induced in the secondary winding 68 of the saturating transformer 62, which induced current flows in the forward direction through the load rectifier 72 and through the load 26. Thus, direct-current voltage appears across the load 26.

During the half-cycle of the supply voltage, when the supply terminal 32' is at a positive polarity with respect to the supply terminal 32, the control rectifier 70 functions in the same manner as does the control rectifier 16 during its gating portion of the supply voltage.

Also, when the supply terminal 32' is at a positive polarity with respect to the supply terminal 32, the supply voltage and the control voltage, as applied to the terminals 14 and 14', are in electrical opposition to one another and cooperate to determine the magnitude of the current flow through the primary winding 18, in the reverse direction. In other words, during the reset portion of the supply voltage with respect to the core member 20, current flows from the supply terminal 32', through the secondary winding 44 of the transformer 40, the control rectifier 16, in the forward direction, the parallel circuit, including the resistor 52 and the load rectifier 34, and the capacitor 77, to the supply terminal 32. This current effectively keeps the control rectifier 16 unblocked so that the control source, the transformer 40, can supply exciting current from the terminal 14', through the primary winding 18, in the reverse direction, and the control rectifier 16, in the reverse direction, to reset the core member 20. An increase in the magnitude of the control voltage as applied to the terminals 14 and 14' increases the magnitude of the current flow through the primary winding 18 in the opposite direction. Also, in operation, the current induced in the secondary winding 24, by the reset voltage across the primary winding 18, is blocked by the load rectifier 28. During the next half-cycle of the supply voltage, when the supply terminal 32 is at a positive polarity with respect to the supply terminal 32', the above-described operation is repeated, thereby producing a direct-current voltage across the load 26.

Figure 6:
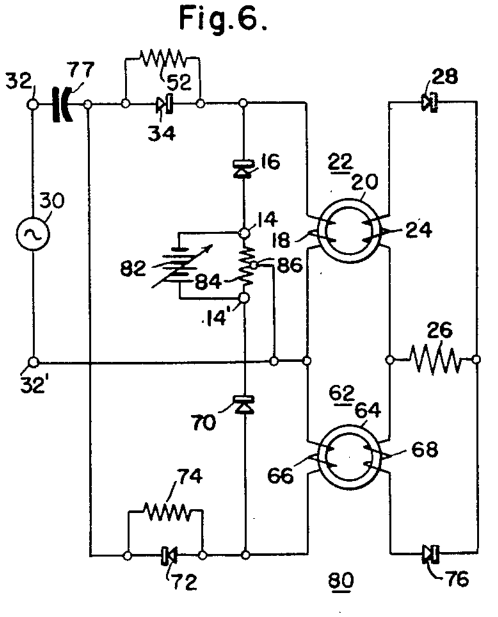
Fig. 6 is a schematic diagram of another full-wave magnetic amplifier illustrating this invention and in which a direct-current control voltage produces a direct-current voltage across the load.

Referring to Fig. 6, there is illustrated another full-wave magnetic amplifier 80 illustrating this invention and in which like components of Figs. 5 and 6 have been given the same reference characters. The main distinction between the apparatus illustrated in Figs. 5 and 6 is that in the apparatus of Fig. 6 a common source 82 of direct-current control voltage has been substituted for the transformer 40, or in other words, for the common source 40 of alternating-current control voltage.

As illustrated, a voltage-dividing resistor 84 is interconnected between the control terminals 14 and 14', the common source 82 of direct-current control voltage being connected to the terminals 14 and 14'. The voltage-dividing resistor 84 is provided with a center tap 86 which is interconnected with the supply terminal 32' and with the junction point of the primary windings 18 and 66. Thus, the voltage-dividing resistor or impedance member 84 comprises two sections. As illustrated, the control rectifiers 16 and 70 are so interconnected with the voltage-dividing resistor 84 and with the source 82 of direct-current control voltage that they function in the same manner as they do in Fig. 5, and the common source 82 of direct-current control voltage is in electrical opposition to the control rectifiers 16 and 70.

In the embodiment of Fig. 6, the primary winding 18 of the saturating transformer 22 is connected in parallel circuit relationship with a circuit including its associated control rectifier 16 and the section of the resistor 84 between the terminal 14 and the center tap 86. On the other hand, the primary winding 66 of the saturating transformer 62 is connected in parallel circuit relationship with a circuit including its associated control rectifier 70 and the section of the resistor 84 between the terminal 14' and the center tap 86.

In practice, the magnitude of the supply voltage across the terminals 32 and 32', is of greater magnitude than either the direct-current control voltage appearing across the section of the voltage-dividing resistor 84 between the control terminal 14 and the center tap 86, or the direct-current control voltage appearing across the section of the voltage-dividing resistor 84 between the control terminal 14' and the center tap 86. Also, in practice, the impedance of the capacitor 77 combined with the back-impedance of the parallel circuit, including the resistor 52 and the load rectifier 34, should be high as compared to the forward-impedance of the circuit including the forward-impedance of the control rectifier 16 and the impedance of that portion of the resistor 84 between the center tap 86 and the control terminal 14. Further, the impedance of the capacitor 77 combined with the back-impedance of the parallel circuit, including the resistor 74 and the load rectifier 72, should be high as compared to the forward-impedance of the circuit including the forward-impedance of the control rectifier 70 and the impedance of that portion of the resistor 84 between the center tap 86 and the control terminal 14'. On the other hand, the impedance of the capacitor 77 combined with the back-impedance of the parallel circuit, including the resistor 52 and the load rectifier 34, should be sufficiently low such that the current flow, during the reset portion of the supply voltage with respect to the core member 20, from the supply terminal 32', through a portion of the resistor 84, the control rectifier 16, in the forward direction, the parallel circuit, including the resistor 52 and the load rectifier 34, and the capacitor 77 to the supply terminal 32, is sufficiently large so as to keep the control rectifier 16 unblocked during the entire resetting half-cycle. In addition, the impedance of the capacitor 77 combined with the back-impedance of the parallel circuit, including the resistor 74 and the load rectifier 72, should be sufficiently low such that the current flow, during the reset portion of the supply voltage with respect to the core member 64, from the supply terminal 32, through the capacitor 77, the parallel circuit, including the resistor 74 and the load rectifier 72, the control rectifier 70, in the forward direction, and a portion of the resistor 84, to the supply terminal 32', is sufficiently large so as to keep the control rectifier 70 unblocked during the entire resetting half-cycle.

The operation of the magnetic amplifier 80 is quite similar to the operation of the magnetic amplifier 60 of Fig. 5 except that in the case of the magnetic amplifier 80 the control voltage for the upper half-wave magnetic amplifier appears between the control terminal 14 and the center tap 86 of the voltage-dividing resistor 84, while the control voltage for the lower half-wave magnetic amplifier appears between the control terminal 14' and the center tap 86 of the voltage-dividing resistor 84. A further description of the operation of the full-wave magnetic amplifier 80 is deemed unnecessary.

Figure 7:
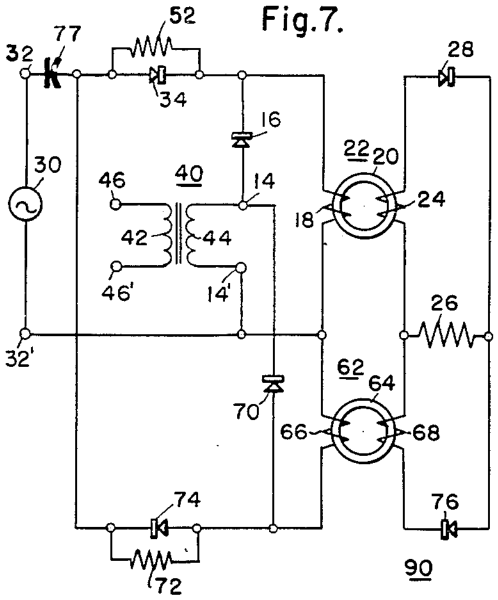
Fig. 7 is a schematic diagram of a full-wave magnetic amplifier similar to the full-wave magnetic amplifier illustrated in Fig. 5 except that an alternating-current voltage is produced across the load.

Referring to Fig. 7 there is illustrated another full-wave magnetic amplifier 90 illustrating this invention and in which like components of Figs. 5 and 7 have been given the same reference characters. The main distinction between the apparatus of Figs. 5 and 7 is that in the apparatus of Fig. 7 the components are so disposed and interconnected as to obtain an alternating-current voltage across the load 26. This is accomplished by winding the secondary winding 68 of the saturating transformer 62 opposite from that manner in which the secondary winding 68 is wound on the magnetic core member 64 illustrated in Fig. 5. Also, the load rectifier 76 of Fig. 7 is interconnected with the load 26 and with the secondary winding 68 in a different manner than is the load rectifier 76 illustrated in Fig. 5.

The operation of the magnetic amplifier 90 illustrated in Fig. 7 will now be described. When the supply terminal 32 is at a positive polarity with respect to the supply terminal 32', current flows from the supply terminal 32 through the capacitor 77, the load rectifier 34, and the primary winding 18 of the saturating transformer 22, in the forward direction, to the supply terminal 32'. This current flow through the primary winding 18 effects an induced current in the secondary winding 24 of the saturating transformer 22, which induced current flows in the forward direction through the load rectifier 28 and through the load 26. During this same half-cycle of the supply voltage, when the supply terminal 32 is at a positive polarity with respect to the supply terminal 32', the induced current in the secondary winding 68 of the saturating transformer 62, as effected by the reset-voltage across the primary winding 66, is blocked by the rectifier 76.

On the other hand, during the next half-cycle of the supply voltage, when the supply terminal 32' is at a positive polarity with respect to the supply terminal 32, current flows from the supply terminal 32' through the primary winding 66 of the saturating transformer 62, in the forward direction, the load rectifier 72, and the capacitor 77, to the supply terminal 32. This current flow through the primary winding 66 effects an induced current in the secondary winding 68 of the saturating transformer 62, which induced current flows through the load 26 and through the load rectifier 76, in the forward direction. Thus, alternating-current voltage is produced across the load 26.

During this same half-cycle of the supply voltage, when the supply terminal 32' is at a positive polarity with respect to the supply terminal 32, the current induced in the secondary winding 24 of the saturating transformer 22, as effected by the reset-voltage across the primary winding 18 of the saturating transformer 22, is blocked by the load rectifier 28. Therefore, the load rectifiers 28 and 76 render the load 26 insensitive to the reset-voltages appearing across the primary windings 18 and 66 of the saturating transformers 22 and 62, respectively.

Figure 8:
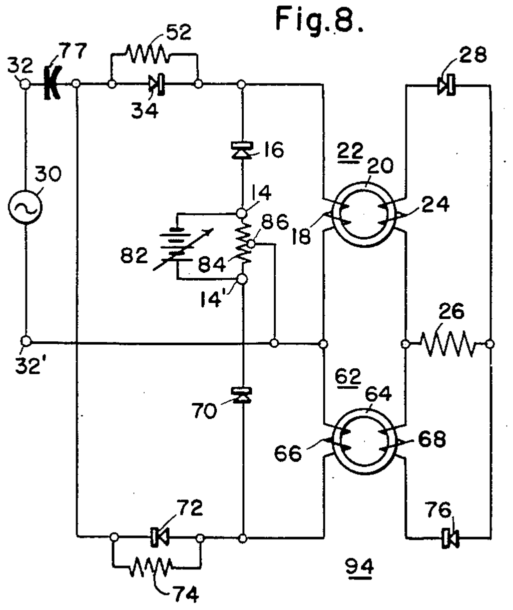
Fig. 8 is a schematic diagram of a full-wave magnetic amplifier similar to the full-wave magnetic amplifier illustrated in Fig. 6 except that an alternating-current voltage is produced across the load.

Referring to Fig. 8 there is illustrated another embodiment of this invention in which like components of Figs. 6, 7 and 8 have been given the same reference characters. As can be seen from Fig. 8, the magnetic amplifier 94 is similar to the magnetic amplifier 80 illustrated in Fig. 6 except that its load circuit is such as to produce alternating-current voltage across the load 26. This is accomplished in the same manner that it was accomplished in the magnetic amplifier 90 of Fig. 7. Therefore, a further description of the magnetic amplifier 94 is deemed unnecessary.

Figure 9:
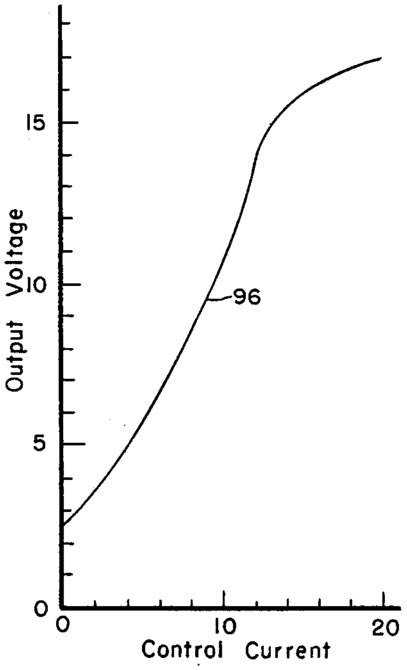
Fig. 9 is a graph illustrating the transfer curve of the full-wave magnetic amplifier illustrated in Fig. 5.

Referring to Fig. 9, there is a graph illustrating a transfer curve 96 representing the manner in which the direct-current output voltage of the magnetic amplifier 60 of Fig. 5, as it appears across the load 26, varies with changes in the magnitude of the alternating-current control voltage, as applied to the input terminals 46 and 46'.

The apparatus embodying the teachings of this invention has several advantages. For instance, the half-wave magnetic amplifiers illustrated herein have a speed of response in the load circuit of one cycle. In addition, the half-wave magnetic amplifiers illustrated herein have a higher power gain than the usual half-wave self-saturating magnetic amplifier. On the other hand, the full-wave magnetic amplifiers illustrated herein have a speed of response in the load circuits of one and one-half cycles. It is to be noted that the speed of response in the load circuits of either the full-wave or half-wave magnetic amplifiers illustrated herein is constant. In the self-saturating full-wave magnetic amplifiers of the prior art the response time in the load circuit may be many seconds, depending on the gain of the magnetic amplifier. It is also to be noted that the quality of the control and load rectifiers illustrated in the various embodiments described hereinbefore do not have to be of high quality since the operation of the apparatus is substantially independent of the leakage of the rectifiers and is substantially independent of changes in the temperature of the air surrounding the various rectifiers. This is particularly true of those rectifiers appearing on the input side of the saturating transformers.

Also the operation of each of the magnetic amplifiers illustrated herein is substantially independent of changes in the magnitude of its supply voltage. In addition, the magnetic amplifiers illustrated herein are capable of producing an output voltage across the load 26 of greater magnitude than the supply voltage as applied to the terminals 32 and 32'. Further, the load 26 of each of the magnetic amplifiers illustrated herein is electrically isolated from its respective control circuit.

Since numerous changes may be made in the above described circuits and apparatus, and since different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. In a magnetic amplifier for controlling the electrical conditions imposed on a load, the combination comprising, a saturable reactor comprising a magnetic core member, a primary winding, and a secondary winding disposed in inductive relationship with the magnetic core member, the secondary winding being connected in circuit relationship with the load, a source of control voltage, a rectifier connected in series circuit relationship with the source of control voltage, a source of alternating-current voltage, the primary winding being connected in parallel circuit relationship with the series circuit comprising the source of control voltage and the rectifier, and circuit means, including an impedance member disposed in non-inductive relationship with respect to the magnetic core member, for connecting said parallel circuit to the source of alternating-current voltage, the voltage of the source of alternating-current voltage being of greater magnitude than the voltage of the source of control voltage, and the rectifier being so disposed that, during one half-cycle of the voltage of the source of alternating-current voltage, the voltage of the source of alternating-current voltage effects a substantially complete magnetic saturation of the magnetic core member, and during the next half-cycle of the voltage of the source of alternating-current voltage, said control voltage cooperates with the voltage of the source of alternating-current voltage to determine the magnitude of the reset-voltage across the primary winding and therefore the amount of resetting of the magnetic core member.

2. In a magnetic amplifier for controlling the electrical conditions imposed on a load, the combination comprising, a saturable reactor comprising a magnetic core member, a primary winding, and a secondary winding disposed in inductive relationship with the magnetic core member, the secondary winding being connected in circuit relationship with the load, a source of control voltage, a control rectifier connected in series circuit relationship with the source of control voltage, a source of alternating-current voltage, the primary winding being connected in parallel circuit relationship with the series circuit comprising the source of control voltage and the control rectifier, and circuit means, including another rectifier, for connecting said parallel connected circuit to the source of alternating-current voltage, the voltage of the source of alternating-current voltage being of greater magnitude than the voltage of the source of control voltage, and the control rectifier being so disposed that, during one half-cycle of the voltage of the source of alternating-current voltage, the voltage of the source of alternating-current voltage effects a substantially complete magnetic saturation of the magnetic core member, and during the next half-cycle of the voltage of the source of alternating-current voltage, said control voltage cooperates with the voltage of the source of alternating-current voltage to determine the magnitude of the reset-voltage across the primary winding and therefore the amount of resetting of the magnetic core member.

3. In a magnetic amplifier for controlling the electrical conditions imposed on a load, the combination comprising, a saturable reactor comprising a magnetic core member, a primary winding, and a secondary winding disposed in inductive relationship with the magnetic core member, the secondary winding being connected in circuit relationship with the load, a source of control voltage, a control rectifier connected in series circuit relationship with the source of control voltage, a source of alternating-current voltage, the primary winding being connected in parallel circuit relationship with the series circuit comprising the source of control voltage and the control rectifier, and circuit means, including another rectifier, for connecting said parallel connected circuit to the source of alternating-current voltage, the voltage of the source of alternating-current voltage being of greater magnitude than the voltage of the source of control voltage, and the control rectifier being so disposed that, during one half-cycle of the voltage of the source of alternating-current voltage, the voltage of the source of alternating-current voltage effects a substantially complete magnetic saturation of the magnetic core member, and during the next half-cycle of the voltage of the source of alternating-current voltage, said control voltage cooperates with the voltage of the source of alternating-current voltage to determine the magnitude of the reset-voltage across the primary winding and therefore the amount of resetting of the magnetic core member, and a resistor connected in parallel circuit relationship with said another rectifier.

4. In a magnetic amplifier for controlling the electrical conditions imposed on a load, the combination comprising, a saturable reactor comprising a magnetic core member, a primary winding, and a secondary winding disposed in inductive relationship with the magnetic core member, circuit means, including a load rectifier, for connecting the secondary winding in circuit relationship with the load, the load rectifier being so disposed as to prevent current induced in the secondary winding during the resetting of the magnetic core member from flowing through the load, a source of control voltage, a control rectifier connected in series circuit relationship with the source of control voltage, a source of alternating-current voltage, the primary winding being connected in parallel circuit relationship with the series circuit comprising the source of control voltage and the control rectifier, other circuit means, including another rectifier, for connecting said parallel connected circuit to the source of alternating-current voltage, the voltage of the source of alternating-current voltage being of greater magnitude than the voltage of the source of control voltage, and the control rectifier being so disposed that during one half-cycle of the voltage of the source of alternating-current voltage, the voltage of the source of alternating-current voltage effects a substantially complete magnetic saturation of the magnetic core member, and during the next half-cycle of the voltage of the source of alternating-current voltage, said control voltage cooperates with the voltage of the source of alternating-current voltage to determine the magnitude of the reset-voltage across the primary winding and therefore the amount of resetting of the magnetic core member.

5. In a magnetic amplifier for controlling the electrical conditions imposed on a load, the combination comprising, a saturable reactor comprising a magnetic core member, a primary winding, and a secondary winding disposed in inductive relationship with the magnetic core member, the secondary winding being connected in circuit relationship with the load, a source of direct-current control voltage, a control rectifier connected in series circuit relationship with the source of direct-current control voltage, said direct-current control voltage being in electrical opposition to the control rectifier, a source of alternating-current voltage, the primary winding being connected in parallel circuit relationship with the series circuit comprising the source of direct-current control voltage and the control rectifier, circuit means, including another rectifier, for connecting said parallel connected circuit to the source of alternating-current voltage, the voltage of the source of alternating-current voltage being of greater magnitude than the voltage of the source of direct-current control voltage, and the control rectifier being so disposed that, during one half-cycle of the voltage of the source of alternating-current voltage, the voltage of the source of alternating-current voltage effects a substantially complete magnetic saturation of the magnetic core member, and during the next half-cycle of the voltage of the source of alternating-current voltage, said direct-current control voltage cooperates with the voltage of the source of alternating-current voltage to determine the magnitude of the reset-voltage across the primary winding and therefore the amount of resetting of the magnetic core member, and a resistor connected in parallel circuit relationship with said another rectifier.

6. In a magnetic amplifier for controlling the electrical conditions imposed on a load, the combination comprising, a saturable reactor comprising a magnetic core member, a primary winding, and a secondary winding disposed in inductive relationship with the magnetic core member, circuit means, including a load rectifier, for connecting the secondary winding in circuit relationship with the load, a source of control voltage, a rectifier connected in series circuit relationship with the source of control voltage, a source of alternating-current voltage, the primary winding being connected in parallel circuit relationship with the series circuit comprising the source of control voltage and the rectifier, and other circuit means, including an impedance member disposed in non-inductive relationship with respect to the magnetic core member, for connecting said parallel connected circuit to the source of alternating-current voltage, the voltage of the source of alternating-current voltage being of greater magnitude than the voltage of the source of control voltage, and the rectifier being so disposed that, during one half-cycle of the voltage of the source of alternating-current voltage, the voltage of the source of alternating-current voltage effects a substantially complete magnetic saturation of the magnetic core member, and during the next half-cycle of the voltage of the source of alternating-current voltage, said control voltage cooperates with the voltage of the source of alternating-current voltage to determine the magnitude of the reset-voltage across the primary winding and therefore the amount of resetting of the magnetic core member.

7. In a full-wave magnetic amplifier for controlling the electrical conditions imposed on a load, the combination comprising, two half-wave magnetic amplifiers each of which comprises, a saturating transformer including a magnetic core member, a primary winding, and a secondary winding disposed in inductive relationship with the magnetic core member, each of the secondary windings being connected in circuit relationship with the load, a common source of control voltage for the two half-wave magnetic amplifiers, a source of alternating-current voltage, a rectifier for each of the two half-wave magnetic amplifiers, the primary winding of each of the two half-wave magnetic amplifiers being connected in parallel circuit relationship with a series circuit including its associated rectifier and the common source of control voltage, and circuit means, including impedance members disposed in non-inductive relationship with respect to the magnetic core members, for connecting said parallel connected circuits to the source of alternating-current voltage, the voltage of the source of alternating-current voltage being of greater magnitude than the voltage of the source of control voltage, and the rectifier of each of the two half-wave magnetic amplifiers being so disposed that, during one half-cycle of the voltage of the source of alternating-current voltage, the voltage of the source of control voltage in cooperation with the voltage of the source of alternating-current voltage effects a resetting of the magnetic core member of one of the two half-wave magnetic amplifiers, and during the same half-cycle the voltage of the source of alternating-current voltage effects a substantially complete magnetic saturation of the magnetic core member of the other of the two half-wave magnetic amplifiers.

8. In a full-wave magnetic amplifier for controlling the electrical conditions imposed on a load, the combination comprising, two half-wave magnetic amplifiers each of which comprises, a saturating transformer including a magnetic core member, a primary winding, and a secondary winding disposed in inductive relationship with the magnetic core member, each of the secondary windings being connected in circuit relationship with the load, a common source of control voltage for the two half-wave magnetic amplifiers, a source of alternating-current voltage, a control rectifier for each of the two half-wave magnetic amplifiers, the primary winding of each of the two half-wave magnetic amplifiers being connected in parallel circuit relationship with a series circuit including its associated control rectifier and the common source of control voltage, and circuit means, including another rectifier associated with each of the two half-wave magnetic amplifiers, for connecting said parallel connected circuits to the source of alternating-current voltage, the voltage of the source of alternating-current voltage being of greater magnitude than the voltage of the source of control voltage, the control rectifier of each of the two half-wave magnetic amplifiers being so disposed that, during one half-cycle of the voltage of the source of alternating-current voltage, the voltage of the source of control voltage in cooperation with the voltage of the source of alternating-current voltage effects a resetting of the magnetic core member of one of the two half-wave magnetic amplifiers, and during the same half-cycle the voltage of the source of alternating-current voltage effects a substantially complete magnetic saturation of the magnetic core member of the other of the two half-wave magnetic amplifiers.

9. In a full-wave magnetic amplifier for controlling the electrical conditions imposed on a load, the combination comprising, two half-wave magnetic amplifiers each of which comprises, a saturating transformer including a magnetic core member, a primary winding, and a secondary winding disposed in inductive relationship with the magnetic core member, each of the secondary windings being connected in circuit relationship with the load, a common source of control voltage for the two half-wave magnetic amplifiers, a source of alternating-current voltage, a control rectifier for each of the two half-wave magnetic amplifiers, the primary winding of each of the two half-wave magnetic amplifiers being connected in parallel circuit relationship with a series circuit including its associated control rectifier and the common source of control voltage, and circuit means, including another rectifier associated with each of the two half-wave magnetic amplifiers, for connecting said parallel connected circuits to the source of alternating-current voltage, the voltage of the source of alternating-current voltage being of greater magnitude than the voltage of the source of control voltage, and the control rectifier of each of the two half-wave magnetic amplifiers being so disposed that, during one half-cycle of the voltage of the source of alternating-current voltage, the voltage of the source of control voltage in cooperation with the voltage of the source of alternating-current voltage effects a resetting of the magnetic core member of one of the two half-wave magnetic amplifiers, and during the same half-cycle the voltage of the source of alternating-current voltage effects a substantially complete magnetic saturation of the magnetic core member of the other of the two half-wave magnetic amplifiers, each of said another rectifiers having a resistor connected in parallel circuit relationship therewith.

10. In a full-wave magnetic amplifier for controlling the electrical conditions imposed on a load, the combination comprising, two half-wave magnetic amplifiers each of which comprises, a saturating transformer including a magnetic core member, a primary winding, and a secondary winding disposed in inductive relationship with the magnetic core member, circuit means, including two load rectifiers, for connecting secondary windings in circuit relationship with the load, a common source of control voltage for the two half-wave magnetic amplifiers, a source of alternating-current voltage, a rectifier for each of the two half-wave magnetic amplifiers, the primary winding of each of the two half-wave magnetic amplifiers being connected in parallel circuit relationship with a series circuit including its associated rectifier and the common source of control voltage, and other circuit means, including impedance members disposed in non-inductive relationship with respect to the magnetic core members, for connecting said parallel connected circuits to the source of alternating-current voltage, the voltage of the source of alternating-current voltage being of greater magnitude than the voltage of the source of control voltage, and the rectifier of each of the two half-wave magnetic amplifiers being so disposed that, during one half-cycle of the voltage of the source of alternating-current voltage, the voltage of the source of control voltage in cooperation with the voltage of the source of alternating-current voltage effects a resetting of the magnetic core member of one of the two half-wave magnetic amplifiers, and during the same half-cycle the voltage of the source of alternating-current voltage effects a substantially complete magnetic saturation of the magnetic core member of the other of the two half-wave magnetic amplifiers.

11. In a full-wave magnetic amplifier for controlling the electrical conditions imposed on a load, the combination comprising, two half-wave magnetic amplifiers each of which comprises, a saturating transformer including a magnetic core member, a primary winding, and a secondary winding disposed in inductive relationship with the magnetic core member, circuit means for connecting each of the secondary windings in circuit relationship with the load so as to obtain a particular type of current flow through the load, a common source of control voltage for the two half-wave magnetic amplifiers, a source of alternating-current voltage, a rectifier for each of the two half-wave magnetic amplifiers, the primary winding of each of the two half-wave magnetic amplifiers being connected in parallel circuit relationship with a series circuit including its associated rectifier and the common source of control voltage, and other circuit means, including impedance members disposed in non-inductive relationship with respect to the magnetic core members, for connecting said parallel connected circuits to the source of alternating-current voltage, the voltage of the source of alternating-current voltage being of greater magnitude than the voltage of the source of control voltage, and the rectifier of each of the two half-wave magnetic amplifiers being so disposed that, during one half-cycle of the voltage of the source of alternating-current voltage, the voltage of the source of control voltage in cooperation with the voltage of the source of alternating-current voltage effects a resetting of the magnetic core member of one of the two half-wave magnetic amplifiers, and during the same half-cycle the voltage of the source of alternating-current voltage effects a substantially complete magnetic saturation of the magnetic core member of the other of the two half-wave magnetic amplifiers.

12. In a full-wave magnetic amplifier for controlling the electrical conditions imposed on a load, the combination comprising, two half-wave magnetic amplifiers each of which comprises, a saturating transformer including a magnetic core member, a primary winding, and a secondary winding disposed in inductive relationship with the magnetic core member, each of the secondary windings being connected in circuit relationship with the load, a common source of direct-current control voltage for the two half-wave magnetic amplifiers, an impedance member, comprising two sections, connected across the common source of direct-current control voltage, a source of alternating-current voltage, a rectifier for each of the two half-wave magnetic amplifiers, the primary winding of one of the two half-wave magnetic amplifiers being connected in parallel circuit relationship with a series circuit including its associated rectifier and one of the two sections of the impedance member, and the primary winding of the other of the two half-wave magnetic amplifiers being connected in parallel circuit relationship with a series circuit including its associated rectifier and the other of the two sections of the impedance member, the direct-current control voltage across said one of the two sections being in electrical opposition to its associated rectifier and the direct-current control voltage across said other of the two sections being in electrical opposition to its associated rectifier, and circuit means, including impedance members disposed in non-inductive relationship with respect to the magnetic core members, for connecting said parallel connected circuits to the source of alternating-current voltage, the voltage of the source of alternating-current voltage being of greater magnitude than the voltage across said one of the two sections and of greater magnitude than the voltage across said other of the two sections, and the rectifier of each of the two half-wave magnetic amplifiers being so disposed that during one half-cycle of the voltage of the source of alternating-current voltage, the voltage of the common source of direct-current control voltage in cooperation with the voltage of the source of alternating-current voltage effects a resetting of the magnetic core member of one of the two half-wave magnetic amplifiers, and during the same half-cycle the voltage of the source of alternating-current voltage effects a substantially complete magnetic saturation of the magnetic core member of the other of the two half-wave magnetic amplifiers.

13. In a full-wave magnetic amplifier for controlling the electrical conditions imposed on a load, the combination comprising, two half-wave magnetic amplifiers each of which comprises, a saturating transformer including a magnetic core member, a primary winding, and a secondary winding disposed in inductive relationship with the magnetic core member, circuit means for connecting each of the secondary windings in circuit relationship with the load so that a particular type of current flows through the load, a common source of direct-current control voltage for the two half-wave magnetic amplifiers, an impedance member, comprising two sections, connected across the common source of direct-current control voltage, a source of alternating-current voltage, a control rectifier for each of the two half-wave magnetic amplifiers, the primary winding of one of the two half-wave magnetic amplifiers being connected in parallel circuit relationship with a series circuit including its associated control rectifier and one of the two sections of the impedance member, and the primary winding of the other of the two half-wave magnetic amplifiers being connected in parallel circuit relationship with a series circuit including its associated control rectifier and the other of the two sections of the impedance member, and other circuit means, including another rectifier associated with each of the two half-wave magnetic amplifiers, for connecting the parallel connected circuits to the source of alternating-current voltage, the voltage of the source of alternating-current voltage being of greater magnitude than the voltage across said one of the two sections, and of greater magnitude than the voltage across said other of the two sections, and the control rectifier each of the two half-wave magnetic amplifiers being so disposed that, during one half-cycle of the voltage of the alternating-current voltage, the voltage of the common source of direct-current control voltage in cooperation with the voltage of the source of alternating-current voltage effects a resetting of the magnetic core member of one of the two half-wave magnetic amplifiers, and during the same half-cycle the voltage of the source of alternating-current voltage effects a substantially complete magnetic saturation of the magnetic core member of the other of the two half-wave magnetic amplifiers, each of said another rectifiers having connected in parallel circuit relationship therewith a resistor.

References Cited in the file of this patent

UNITED STATES PATENTS

| | | |
|---|---|---|
| 2,126,790 | Logan | Aug. 16, 1938 |

FOREIGN PATENTS

| | | |
|---|---|---|
| 480,067 | Great Britain | Feb. 16, 1938 |
| 555,004 | Great Britain | July 29, 1943 |
| 583,497 | Great Britain | Dec. 19, 1946 |

OTHER REFERENCES

Ramey: "On the Mechanics of Magnetic Amplifier Operation," AIEE Technical Paper 51–217, published by American Institute of Electrical Engineers, New York, N. Y., May 1951 (26 pages) (pages 19–25 relied on).